UNITED STATES PATENT OFFICE.

PETER SWEENEY, OF NEW YORK, N. Y., ASSIGNOR TO HIMSELF AND WILLIAM BOURGOYNE BISHOP, OF SAME PLACE.

IMPROVEMENT IN TREATING RAWHIDE.

Specification forming part of Letters Patent No. 185,799, dated December 26, 1876; application filed May 20, 1876.

*To all whom it may concern:*

Be it known that I, PETER SWEENEY, of the city, county, and State of New York, have invented a new and useful Improvement in Treating Rawhide, which invention is fully set forth in the following specification.

This invention consists in preparing rawhide by soaking it in water, and then impregnating it with a compound of graphite and bees-wax or paraffine, or any drying oil or gum which allows the hide to resume its original condition and hardness; also, in the product obtained by treating rawhide, as above stated.

In carrying out my invention, I take rawhide and soften the same in water, so as to open its pores, and then I immerse it in a compound made of graphite and bees-wax, which is kept at a moderate heat so as to keep the same in a liquid state. Instead of bees-wax, however, paraffine or any other suitable drying oil or gum may be substituted without deviating from my invention.

In order to impregnate the softened rawhide thoroughly with the compound, I prefer to use an ordinary stuffing-drum from which the air can be exhausted, and which is kept in motion to prevent the graphite from settling down.

After the rawhide has been impregnated with my compound, I allow the same to dry, and, when dry, my prepared rawhide assumes a hard condition; but it can be readily softened and pressed into molds, or brought in any desired form or shape.

By treating rawhide according to my process an article is produced which can be used with great advantage as a lubricator in journal-boxes or bearings of any kind, the nature of my prepared rawhide being such that it prevents the bearing from running hot, and that no other lubricating material is required.

What I claim as new, and desire to secure by Letters Patent, is—

1. The process of preparing rawhide by first soaking it in water, and then impregnating the same with a compound of graphite and bees-wax or paraffine, or other equivalent material, substantially as described.

2. As a new article of manufacture, rawhide treated and prepared in the manner set forth.

In testimony that I claim the foregoing I have hereunto set my hand and seal this 5th day of May, 1876.

PETER SWEENEY. [L. S.]

Witnesses:
  W. HAUFF,
  E. F. KASTENHUBER.